3,030,197
THERMALLY STABLE DISTILLATE FUELS
Richard L. Godar, Crestwood, and Verner L. Stromberg, Webster Groves, Mo., assignors to Petrolite Corporation
No Drawing. Filed Nov. 22, 1960, Ser. No. 70,928
31 Claims. (Cl. 44—72)

This application is a continuation-in-part of each of our copending applications Ser. Nos. 698,402; 698,403; 698,404; 698,405; 698,406; 698,407; 698,408 and 698,409, all filed November 25, 1957, and now abandoned.

The present invention is concerned with a fuel composition which has been stabilized by means of an additive against the formation of sludge and undesirable color bodies, especially under high temperature conditions as in diesel and jet fuel engines where the fuel is preheated for some time before consumption and thereby introduces an additional problem of thermal instability. The deterioration of hydrocarbon fuel oils, and more particularly furnace oils, diesel fuels, jet engine fuels, distillate fuel oils, so-called "middle oil distillates," and the like is a commonly recognized problem.

The problem, particularly from the standpoint of sludge formation, is stated briefly in U.S. Patent 2,793,943, dated May 28, 1957, to Moore.

As to discoloration, reference is made to U.S. Patent No. 2,711,947, dated June 28, 1955, to Smith et al.

We have found we can impart nonclogging properties and discoloration inhibiting properties to hydrocarbon fuels of the kind previously described by the addition of about 5 to 200 pounds per thousand barrels of the oxyalkylation product derived by the oxyalkylation of water soluble, oil insoluble polyamines having at least two basic nitrogen atoms and being polyfunctional towards olefin oxide addition by reacting said amines with at least one monoepoxide having not over 18 carbon atoms to a point where at least water solubility is negligible and the oxyalkylated product is soluble in fuel oil of the kind above described and even in straight run kerosene.

The polyamines are further characterized by having at least two basic nitrogen atoms and not more than 7 basic nitrogen atoms. They are further characterized by the absence of any radical having at least 8 uninterrupted carbon atoms. The polyamines are preferably alkyl alkylene polyamines in which the alkyl alkylene radical is ethylene, propylene, trimethylene, hexamethylene, etc. The carbon atom chain may be interrupted by oxygen as, for example, polyamines obtained by reacting ammonia with dichloroethylether. The amines may contain one or more hydroxyl radicals as, for example, triethylene tetramine which has been reacted with one mole of ethylene oxide. The preferred amines are ethylene diamine, diethylene triamine, triethylene tetramine, tetraethylene pentamines, and the high boiling distillates which appear in the manufacture of tetraethylene pentamine but apparently cannot be separated from each other and consist largely of pentaethylene hexamine and hexaethylene heptamine. This high boiling residual fraction is generally marketed simply as high boiling non-distillable polyalkylene amine residue. Our preferred reactants are diethylene triamine, triethylene tetramine, and tetraethylene pentamine.

Oxyalkylation procedures, whether involving ethylene oxide, propylene oxide, butylene oxide, or for that matter octylene oxide, have been described extensively in the technical literature and particularly in a large number of patents as well as in pamphlets or brochures which are available from the manufacturers of the various oxides.

In the case of butylene oxide the product that is most readily available commercially and the one that is preferred contains approximately 85% or more of 1,2-isomer and approximately 15% of the 2,3-cis- and the 2,3-trans-isomer with substantially none or not over 1% of the isobutylene oxide.

Generally speaking, the oxyalkylation of a basic amine is not apt to require a catalyst in the early stages. Subsequently a catalyst is required and, generally speaking, the one preferred is a basic catalyst such as caustic soda, sodium methylate or the like. The catalyst may be added at the start.

Other epoxides which may be employed include, among others: allyl glycidyl ether, glycidyl isopropyl ether, glycidyl phenyl ether, trimethylene oxide, dodecene oxide, $C_{16}$–$C_{18}$ olefin oxide, vinylcyclohexene oxide, cyclohexene oxide, alpha pinene oxide, dipentene oxide, and styrene oxide. Similarly, methylglycide may be employed instead of glycide.

The additives obtained in the manner indicated are characterized by being composed exclusively of the elements carbon, hydrogen, oxygen and nitrogen. The amino reactants have a molecular weight of not over 275 and the oxyalkylated derivatives herein described vary in molecular weight from 300 to 8500.

For the purpose of convenience, what is said hereinafter will be divided into four parts:

Part 1 is concerned with suitable reactants and more specifically with the polyamine reactant for the reason that the oxide or oxides employed have been referred to previously and are illustrated subsequently by example;

Part 2 is concerned with examples of oxyalkylation employing a group of oxides used singly or in combination and limited to the group consisting of propylene oxide, butylene oxide, octylene oxide, ethylene oxide and glycide.

For convenience, Part 2 will be divided into seven sections. Section A is concerned with examples derived from butylene oxide. Section B is concerned with products derived by means of propylene oxide alone. Section C is concerned with products derived by means of octylene oxide alone. Section D is concerned with compounds derived by any two of the aforementioned oxides without use of either ethylene oxide or glycide. Section E is concerned with derivatives obtained in the same manner as described in Section D except that either ethylene oxide or glycide is used in combination with the other two oxides. Section F is concerned with oxyalkylation products involving the use of all three of the aforementioned oxides but without the use of either ethylene oxide or glycide. Section G is comparable to Section F preceding, but differentiated by the fact that either ethylene oxide or glycide, or both, are used in connection with the three oxides as noted.

Part 3 is concerned with oxyalkylation procedures employed to convert water-soluble and oil-insoluble polyamines into water-insoluble and oil-soluble derivatives by oxyalkylation procedures which involve the use, at least in part, of oxides previously noted above but not employed in the examples of Part 2. Included are styrene oxide, dodecene oxide, $C_{16}$–$C_{18}$ olefin oxide, alpha pinene oxide, dipentene monoxide, cyclohexene oxide, vinyl cyclohexene oxide, etc. Part 3, for convenience, is divided into two sections. Section A is concerned with the use of these oxides either alone or in combination with ethylene oxide, glycide or methyl glycide, but without using propylene oxide, butylene oxide, or octylene oxide. Section B is similar to Section A preceding except that the oxyalkylation derivatives, whether involving the use of ethylene oxide, glycide, methylglycide or not, do involve one or more of the oxides of the group of propylene oxide, butylene oxide, and octylene oxide in combination with the oxides mentioned in Section A preceding.

Part 4 is concerned with the use of the herein described fuel oil additives along with tests showing the superior results obtained by the use thereof.

PART 1

Suitable amines which may be employed are the following:

Ethylene diamine
Propylene diamine
Hexamethylene diamine
Diethylene triamine
Triethylene tetramine
Tetraethylene pentamine
N,N'-diethyl ethylenediamine
N,N-dimethyl ethylenediamine
Ethylenebisoxypropylamine
3,3'-iminobispropylamine
N-(3-aminopropyl) morpholine
N-aminoethyl morpholine
3-diethylaminopropyl amine
3-dimethyl aminopropyl amine
N-aminoethylpropylene diamine
Piperazine
N-methyl piperazine
Aminoethyl piperazine
N,N'-dihydroxyethyl ethylene diamine
N-hydroxyethyl propylene diamine
Hydroxyethyl piperazine
N-aminoethyl tetraethylene pentamine
N-aminoethyl tetraethylene pentamine+ethylene imine A tetraethylene pentamine or other suitable compound may be reacted with ethylene imine in the ratio of one or two moles of ethylene imine or, for that matter, with one or two moles of propylene imine per mole of precursory polyamine.

PART 2

Section A

*Example 1a.*—The reaction vessel employed was a stainless steel autoclave with the usual devices for heating, heat control, stirrer, inlet, outlet, etc., which is conventional in this type of apparatus. The capacity was approximately 4 liters. The strirrer operated at a speed of approximately 250 r.p.m. There were charged into the autoclave 200 grams of propylene diamine, 100 grams of xylene and 9 grams of sodium methylate. The autoclave was sealed, swept with nitrogen gas and stirring started immediately and heat applied. The temperature was allowed to rise to approximately 125° C. At this particular time the addition of propylene oxide was started. It was added continuously at such speed that it was absorbed by the reaction as added. The amount added in this operation was 1500 grams. The time required to add the propylene oxide was one hour. During this period the temperature was maintained at 125° C. to 130° C., using cooling water through the inner coils when necessary and otherwise applying heat if required. The maximum pressure during the reaction was 48 pounds per square inch. Ignoring the xylene and sodium methylate and considering only the propylene diamine for convenience, the resultant product represents 75 parts by weight of propylene oxide to one part by weight of propylene diamine.

*Example 8a.*—The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 200 grams of diethylene triamine, 100 grams of xylene and 9 grams of sodium methylate. The autoclave was sealed, swept with nitrogen gas and stirring started immediately and heat applied. The temperature was allowed to rise to approximately 135° C. At this particular time the addition of propylene oxide was started. It was added continuously at such speed that it was absorbed by the reaction as added. The amount added in this operation was 1500 grams. The time required to add the propylene oxide was one hour. During this period the temperature was maintained at 130° C. to 135° C., using cooling water through the inner coils when necessary and otherwise applying heat if required. The maximum pressure during the reaction was 48 pounds per square inch. The reaction mass was transferred to a larger autoclave (capacity 15 liters). Without adding any more solvent or any more xylene the procedure was repeated so as to add another 1500 grams of propylene oxide under substantially the same operating conditions but requiring about 3 hours for the second oxide addition. At the end of this step the ratio represented approximately 15 to 1 (ratio propylene oxide to diethylene triamine). 3000 grams of xylene were now added and the resulting solution water washed to remove the catalyst. The resulting mixture was dried by azeotroping the water in the reaction mixture with part of the xylene present.

*Example 15a.*—The procedure used was similar to that in Example 8a except that tetraethylene pentamine was employed and a third step was used in which 1500 grams of propylene oxide was added over a period of 3 hours. The dilution with xylene, water wash, and drying was similar to that employed in Example 8a.

The ratio at the end of the third step was 22.5 parts by weight of propylene oxide per weight of tetraethylene pentamine.

*Example 22a.*—The procedure used was similar to that in Example 15a except ethylenebisoxypropylamine was employed and a fourth step was used in which 1500 grams of propylene oxide was added over a period of 4 hours. The third step required two hours instead of the six hours necessary in Example 15a. At the end of the reaction the product represented approximately 30 parts of propylene oxide by weight to one part of ethylenebisoxypropylamine.

TABLE I

| Ex. No. | Amine | Amine, grs. | Propylene oxide, grams | Time period, hrs. | Max. Temp., °C. | Weight ratio, oxide/amine | Molal ratio, oxide/amine | 1 part/100 by solubility weight in $H_2O$, 20° C. | 1 part/100 by solubility weight in kerosene, 20° C. |
|---|---|---|---|---|---|---|---|---|---|
| 1a | Propylene diamine | 200 | 1,500 | 1 | 130 | 7.5 | 9.6 | Partially soluble | Partially soluble. |
| 2a | ....do.... | 200 | 3,000 | 4 | 130 | 15 | 19.2 | ....do.... | Do. |
| 3a | ....do.... | 200 | 4,500 | 8 | 130 | 22.55 | 28.8 | Insoluble | Soluble. |
| 4a | ....do.... | 200 | 6,000 | 11 | 130 | 30.0 | 38.4 | ....do.... | Do. |
| 5a | ....do.... | 200 | 7,500 | 15 | 130 | 39.5 | 44.8 | ....do.... | Do. |
| 6a | ....do.... | 200 | 8,500 | 19 | 130 | 42.5 | 54.4 | ....do.... | Do. |
| 7a | Diethylene triamine | 200 | 1,500 | 1 | 135 | 7.5 | 13.3 | Partially soluble | Partially soluble. |
| 8a | ....do.... | 200 | 3,000 | 4 | 135 | 15.0 | 26.6 | Very slightly soluble | Soluble. |
| 9a | ....do.... | 200 | 4,500 | 7 | 135 | 22.5 | 40 | Insoluble | Do. |
| 10a | ....do.... | 200 | 6,000 | 10 | 135 | 30 | 53.2 | ....do.... | Do. |
| 11a | ....do.... | 200 | 7,500 | 14 | 135 | 37.5 | 62 | ....do.... | Do. |
| 12a | ....do.... | 200 | 8,500 | 18 | 135 | 42.5 | 75.5 | ....do.... | Do. |

TABLE II

| Ex. No. | Amine | Amine, grs. | Propylene oxide, grams | Time period, hrs. | Max. Temp., °C. | Weight ratio, oxide/amine | Molal ratio, oxide/amine | 1 part/100 by solubility weight in H₂O, 20° C. | 1 part/100 by solubility weight in kerosene, 20° C. |
|---|---|---|---|---|---|---|---|---|---|
| 13a | Tetraethylene pentamine | 200 | 1,500 | 2 | 135 | 7.5 | 24.5 | Partially soluble | Partially soluble. |
| 14a | ----do---- | 200 | 3,000 | 4 | 135 | 15 | 49 | Insoluble | Soluble. |
| 15a | ----do---- | 200 | 4,500 | 7 | 135 | 22.5 | 73.5 | ----do---- | Do. |
| 16a | ----do---- | 200 | 6,000 | 10 | 135 | 30.0 | 98 | ----do---- | Do. |
| 17a | ----do---- | 200 | 7,500 | 14 | 135 | 37.5 | 122 | ----do---- | Do. |
| 18a | ----do---- | 200 | 8,500 | 18 | 135 | 42.5 | 138 | ----do---- | Do. |
| 19a | Ethylenebisoxypropylamine | 200 | 1,500 | 1 | 135 | 7.5 | 22.7 | Partially soluble | Partially soluble. |
| 20a | ----do---- | 200 | 3,000 | 2 | 135 | 15 | 45.4 | Very slightly soluble | Soluble. |
| 21a | ----do---- | 200 | 4,500 | 4 | 135 | 22.5 | 68 | Insoluble | Do. |
| 22a | ----do---- | 200 | 6,000 | 8 | 135 | 30.0 | 90.8 | ----do---- | Do. |
| 23a | ----do---- | 200 | 7,500 | 11 | 135 | 37.5 | 113.5 | ----do---- | Do. |
| 24a | ----do---- | 200 | 8,500 | 15 | 135 | 42.5 | 129 | ----do---- | Do. |

TABLE III

| Ex. No. | Amine | Amine, grs. | Propylene oxide, grams | Time period, hrs. | Max. Temp., °C. | Weight ratio, oxide/amine | Molal ratio, oxide/amine | 1 part/100 by solubility weight in H₂O, 20° C. | 1 part/100 by solubility weight in kerosene, 20° C. |
|---|---|---|---|---|---|---|---|---|---|
| 25a | Diethylaminopropylamine | 200 | 1,500 | 2 | 135 | 7.5 | 16.8 | Slightly soluble | Very slightly soluble. |
| 26a | ----do---- | 200 | 3,000 | 4 | 135 | 15.0 | 33.6 | ----do---- | Slightly soluble. |
| 27a | ----do---- | 200 | 4,500 | 9 | 135 | 22.5 | 50.3 | Very slightly soluble | Soluble. |
| 28a | ----do---- | 200 | 6,000 | 13 | 135 | 30.0 | 67.2 | Insoluble | Do. |
| 29a | ----do---- | 200 | 7,500 | 17 | 135 | 37.5 | 84 | ----do---- | Do. |
| 30a | ----do---- | 200 | 8,500 | 21 | 135 | 42.5 | 95.2 | ----do---- | Do. |
| 31a | 3,3'-iminobispropylamine | 200 | 1,500 | 2 | 135 | 7.5 | 17 | Slightly soluble | Slightly soluble. |
| 32a | ----do---- | 200 | 3,000 | 4 | 135 | 15 | 34 | Very slightly soluble | Soluble. |
| 33a | ----do---- | 200 | 4,500 | 7 | 135 | 22.5 | 51 | Insoluble | Do. |
| 34a | ----do---- | 200 | 6,000 | 10 | 135 | 30.0 | 68 | ----do---- | Do. |
| 35a | ----do---- | 200 | 7,500 | 14 | 135 | 37.5 | 85 | ----do---- | Do. |
| 36a | ----do---- | 200 | 8,500 | 18 | 135 | 42.5 | 96 | ----do---- | Do. |

Section B

*Example 1b.*—The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of propylene diamine, 300 grams of xylene and 15 grams of sodium methylate. The autoclave was sealed, swept with nitrogen gas and stirring started immediately and heat applied. The temperature was allowed to rise to approximately 155° C. At this particular time the addition of butylene oxide was started. The butylene oxide employed was a mixture of the straight chain isomers substantially free from isobutylene oxide. It was added continuously at such speed that it was absorbed by the reaction as added. The amount added in this operation was 1500 grams. The time required to add the butylene oxide was two hours. During this period the temperature was maintained at 140° C. to 155° C., using cooling water through the inner coils when necessary and otherwise applying heat if required. The maximum pressure during the reaction was 48 pounds per square inch. Ignoring the xylene and sodium methylate and considering only the propylene diamine for convenience, the resultant product represents 3 parts by weight of butylene oxide to one part by weight of propylene diamine. The xylene present represented approximately .6 of one part by weight.

*Example 8b.*—The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of diethylene triamine, 200 grams of xylene, and 15 grams of sodium methylate. The autoclave was sealed, swept with nitrogen gas and stirring started immediately and heat applied. The temperature was allowed to rise to approximately 155° C. At this particular time the addition of butylene oxide was started. The butylene oxide employed was a mixture of the straight chain isomers substantially free from isobutylene oxide. It was added continuously at such speed that it was absorbed by the reaction as added. The amount added in this operation was 1500 grams. The time required to add the butylene oxide was two hours. During this period the temperature was maintained at 140° C. to 155° C., using cooling water through the inner coils when necessary and otherwise applying heat if required. The maximum pressure during the reaction was 48 pounds per square inch. The reaction mass was transferred to a larger autoclave (capacity 15 liters). Without adding any more solvent or any more xylene the procedure was repeated so as to add another 1500 grams of butylene oxide under substantially the same operating conditions but requiring about 3 hours for the second oxide addition. At the end of this step the ratio represented approximately 6 to 1 (ratio butylene oxide to diethylene triamine). 3500 grams of xylene were now added and the resulting solution water washed to remove the catalyst. The resulting mixture was dried by azeotroping the water in the reaction mixture with part of the xylene present.

*Example 15b.*—The procedure used was similar to that in Example 8b except that tetraethylene pentamine was employed and a third step was used in which 1625 grams of butylene oxide was added over a period of six hours. The dilution with xylene, water wash, and drying was similar to that employed in Example 8b.

The ratio at the end of the third step was 9.25 parts by weight of butylene oxide per weight of tetraethylene pentamine.

*Example 22b.*—The procedure used was similar to that in Example 15b except ethylenebisoxypropylamine was employed and a fourth step was used in which 1625 grams of butylene oxide was added over a period of 4¼ hours. The third step required 3¾ hours instead of the six hours necessary in Example 15b. At the end of the reaction the product represented approximately 12.5 parts of butylene oxide by weight to one part of ethylenebisoxypropylamine.

TABLE IV

| Ex. No. | Amine | Amine, grs. | Butylene oxide, grams | Time period, hrs. | Max. Temp., °C. | Weight ratio, oxide/amine | Molal ratio, oxide/amine | 1 part/100 by weight in H$_2$O, 20° C. solubility | 1 part/100 by weight in kerosene, 20° C. solubility |
|---|---|---|---|---|---|---|---|---|---|
| 1b | Propylene diamine | 500 | 1,500 | 2 | 155 | 3 | 3.1 | Partially soluble | Partially soluble. |
| 2b | do | 500 | 3,000 | 5 | 155 | 6 | 6.2 | do | Do. |
| 3b | do | 500 | 4,625 | 11 | 155 | 9.25 | 9.5 | Insoluble | Soluble. |
| 4b | do | 500 | 6,250 | 14½ | 155 | 12.5 | 13 | do | Do. |
| 5b | do | 500 | 7,750 | 12 | 155 | 15.5 | 16 | do | Do. |
| 6b | do | 500 | 9,500 | 23 | 155 | 19 | 19.6 | do | Do. |
| 7b | Diethylene triamine | 500 | 1,500 | 2 | 155 | 3 | 4.3 | Partially soluble | Partially soluble. |
| 8b | do | 500 | 3,000 | 5 | 155 | 6 | 8.6 | Very slightly soluble | Soluble. |
| 9b | do | 500 | 4,625 | 11 | 155 | 9.25 | 13.25 | Insoluble | Do. |
| 10b | do | 500 | 6,250 | 14½ | 155 | 12.5 | 17.9 | do | Do. |
| 11b | do | 500 | 7,750 | 19 | 155 | 15.5 | 22.2 | do | Do. |
| 12b | do | 500 | 9,500 | 13 | 155 | 19 | 27.2 | do | Do. |

TABLE V

| Ex. No. | Amine | Amine, grs. | Butylene oxide, grams | Time period, hrs. | Max. Temp., °C. | Weight ratio, oxide/amine | Molal ratio, oxide/amine | 1 part/100 by weight in H$_2$O, 20° C. solubility | 1 part/100 by weight in kerosene, 20° C. solubility |
|---|---|---|---|---|---|---|---|---|---|
| 13b | Tetraethylene pentamine | 500 | 1,500 | 2 | 152 | 3 | 7.9 | Partially soluble | Partially soluble. |
| 14b | do | 500 | 3,000 | 5 | 152 | 6 | 15.8 | Insoluble | Soluble. |
| 15b | do | 500 | 4,625 | 11 | 152 | 9.25 | 24.3 | do | Do. |
| 16b | do | 500 | 6,250 | 14½ | 152 | 12.5 | 32.8 | do | Do. |
| 17b | do | 500 | 7,750 | 19 | 152 | 15.5 | 40.7 | do | Do. |
| 18b | do | 500 | 9,500 | 23 | 152 | 19 | 49.8 | do | Do. |
| 19b | Ethylenebisoxypropylamine | 500 | 1,500 | ¹50 | 156 | 3 | 7.3 | Partially soluble | Partially soluble. |
| 20b | do | 500 | 3,000 | 3½ | 156 | 6 | 14.6 | Very slightly soluble | Soluble. |
| 21b | do | 500 | 4,625 | 7½ | 156 | 8.5 | 20.8 | Insoluble | Do. |
| 22b | do | 500 | 6,250 | 11¾ | 156 | 12.5 | 30.6 | do | Do. |
| 23b | do | 500 | 7,750 | 16 | 156 | 15.5 | 37.9 | do | Do. |
| 24b | do | 500 | 9,500 | 20 | 156 | 19 | 46.5 | do | Do. |

¹ Minutes.

TABLE VI

| Ex. No. | Amine | Amine, grs. | Butylene oxide, grams | Time period, hrs. | Max. Temp., °C. | Weight ratio, oxide/amine | Molal ratio, oxide/amine | 1 part/100 by weight in H$_2$O, 20° C. solubility | 1 part/100 by weight in kerosene, 20° C. solubility |
|---|---|---|---|---|---|---|---|---|---|
| 25b | Diethyl aminopropylamine | 500 | 545 | 2 | 156 | 1.1 | 2 | Slightly soluble | Very slightly soluble. |
| 26b | do | 500 | 1,090 | 6 | 156 | 2.2 | 4 | do | Slightly soluble. |
| 27b | do | 500 | 1,635 | 10 | 156 | 3.3 | 6 | Very slightly soluble | Soluble. |
| 28b | do | 500 | 2,180 | 15 | 156 | 4.4 | 8 | Insoluble | Do. |
| 29b | do | 500 | 2,725 | 21 | 156 | 5.4 | 10 | do | Do. |
| 30b | do | 500 | 3,815 | 28 | 156 | 7.5 | 14 | do | Do. |
| 31b | 3,3'-iminobispropylamine | 500 | 1,500 | 2 | 152 | 3 | 5.5 | Slightly soluble | Slightly soluble. |
| 32b | do | 500 | 3,000 | 5 | 152 | 6 | 10.9 | Very slightly soluble | Soluble. |
| 33b | do | 500 | 4,625 | 11 | 152 | 9.25 | 16.8 | Insoluble | Do. |
| 34b | do | 500 | 6,250 | 14½ | 152 | 12.5 | 22.7 | do | Do. |
| 35b | do | 500 | 7,750 | 18 | 152 | 15.5 | 28.2 | do | Do. |
| 36b | do | 500 | 9,500 | 22 | 152 | 19 | 34.5 | do | Do. |

Section C

*Example 1c.*—The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of propylene diamine, 300 grams of xylene and 15 grams of sodium methylate. The autoclave was sealed, swept with nitrogen gas and stirring started immediately, and heat applied. The temperature was allowed to rise to approximately 175° C. At this particular time the addition of octylene oxide was started. It was added continuously at such speed that it was absorbed by the reaction as added. The amount added in this operation was 1500 grams. The time required to add the octylene oxide was six hours. During this period the temperature was maintained at 157° C. to 185° C., using cooling water through the inner coils when necessary and otherwise applying heat if required. The maximum pressure during the reaction was 48 pounds per square inch. Ignoring the xylene and sodium methylate and considering only the propylene diamine for convenience, the resultant product represents 3 parts by weight of octylene oxide to one part by weight of propylene diamine. The xylene present represented approximately .6 of one part by weight.

*Example 8c.*—The reaction vessel employed was a stainless steel autoclave with the usual devices for heating, heat control, stirrer, inlet, outlet, etc., which is conventional in this type of apparatus. The capacity was approximately 250 r.p.m. There were charged into the autoclave 500 grams of diethylene triamine, 300 grams of xylene, and 15 grams of sodium methylate.

The autoclave was sealed, swept with nitrogen gas and stirring started immediately and heat applied. The temperature was allowed to rise to approximately 175° C. At this particular time the addition of octylene oxide was started. It was added continuously at such speed that it was absorbed by the reaction as added. The amount added in this operation was 1500 grams. The time required to add the octylene oxide was six hours. During this period the temperature was maintained at 157° C. to 185° C., using cooling water through the inner coils when necessary and otherwise applying heat if required. The maximum pressure during the reaction was 48 pounds per square inch. The reaction mass was transferred to a larger autoclave (capacity 15 liters). Without adding any more solvent or any more xylene the procedure was repeated so as to add another 1500 grams of octylene oxide under substantially the same operating conditions but requiring about 9 hours for the second oxide addition. At the end of this step the ratio represented approximately 6 to 1 (ratio octylene oxide to diethylene triamine). 3500 grams of xylene were now added and the resulting solution water washed to remove the catalyst. The resulting mixture was dried by azeotroping the water in the reaction mixture with part of the xylene present.

*Example 15c.*—The procedure used was similar to that in Example 8c except that tetraethylene pentamine was employed and a third step was used in which 1625 grams of octylene oxide was added over a period of fifteen hours. The dilution with xylene, water wash, and drying was similar to that employed in Example 8c.

The ratio at the end of the third step was 9.25 parts by weight of octylene oxide per weight of tetraethylene pentamine.

*Example 22c.*—The procedure used was similar to that in Example 15c except ethylenebisoxypropylamine was employed and a fourth step was used in which 1625 grams of octylene oxide was added over a period of ten hours. At the end of the reaction the product represented approximately 12.5 parts of octylene oxide by weight to one part of ethylenebisoxypropylamine.

xylene and 15 grams of sodium methylate. The autoclave was sealed, swept with nitrogen gas and stirring started immediately and heat applied. The temperature was allowed to rise to rise to approximately 155° C. At this particular time the addition of butylene oxide was started. It was added continuously at such speed that it was absorbed by the reaction as added. The amount added in this operation was 400 grams. The time required to add the butylene oxide was two hours. During this period the temperature was maintained at 150 to 155° C., applying heat as required. The maximum pressure during the reaction was 48 pounds per square inch.

Ignoring the xylene and sodium methylate and considering only the polyamine and the alkylene oxides, the resultant product represents 7.5 parts by weight of propylene oxide, 2 parts by weight of butylene oxide to one part by weight of propylene diamine.

*Example 20d.*—The procedure was similar to that in Example 1d except a 15 liter autoclave was used and

TABLE VII

| Ex. No. | Amine | Amine, grs. | Octylene oxide, grams | Time period, hrs. | Max. Temp., °C. | Weight ratio, oxide/amine | Molal ratio, oxide/amine | 1 part/100 by solubility weight in H₂O, 20° C. | 1 part/100 by solubility weight in kerosene, 20° C. |
|---|---|---|---|---|---|---|---|---|---|
| 1c | Propylene diamine | 500 | 1,500 | 6 | 185 | 3 | 1.7 | Partially soluble | Partially soluble. |
| 2c | do | 500 | 3,000 | 15 | 185 | 6 | 2.4 | Insoluble | Soluble. |
| 3c | do | 500 | 4,625 | 30 | 185 | 9.25 | 5.2 | do | Do. |
| 4c | do | 500 | 6,250 | 40 | 185 | 12.5 | 7.0 | do | Do. |
| 5c | do | 500 | 7,750 | 47 | 185 | 15.5 | 8.7 | do | Do. |
| 6c | do | 500 | 9,500 | 54 | 185 | 19 | 10.8 | do | Do. |
| 7c | Diethylene triamine | 500 | 1,500 | 6 | 185 | 3 | 2.4 | Very slightly soluble | Do. |
| 8c | do | 500 | 3,000 | 15 | 185 | 6 | 4.8 | Insoluble | Do. |
| 9c | do | 500 | 4,625 | 30 | 185 | 9.25 | 7.4 | do | Do. |
| 10c | do | 500 | 6,250 | 40 | 185 | 12.5 | 10.0 | do | Do. |
| 11c | do | 500 | 7,750 | 47 | 185 | 15.5 | 12.4 | do | Do. |
| 12c | do | 500 | 9,500 | 54 | 185 | 19 | 15.2 | do | Do. |

TABLE VIII

| Ex. No. | Amine | Amine, grs. | Octylene oxide, grams | Time period, hrs. | Max. Temp., °C. | Weight ratio, oxide/amine | Molal ratio, oxide/amine | 1 part/100 by solubility weight in H₂O, 20° C. | 1 part/100 by solubility weight in kerosene, 20° C. |
|---|---|---|---|---|---|---|---|---|---|
| 13c | Tetraethylene Pentamine | 500 | 1,500 | 6 | 195 | 3 | 4.4 | Partially soluble | Soluble. |
| 14c | do | 500 | 3,000 | 15 | 195 | 6 | 8.8 | Insoluble | Do. |
| 15c | do | 500 | 4,625 | 30 | 195 | 9.25 | 13.7 | do | Do. |
| 16c | do | 500 | 6,250 | 40 | 195 | 12.5 | 18.4 | do | Do. |
| 17c | do | 500 | 7,750 | 47 | 195 | 15.5 | 22.9 | do | Do. |
| 18c | do | 500 | 9,500 | 54 | 195 | 19 | 28.1 | do | Do. |
| 19c | Ethylene bisoxypropylamine | 500 | 1,500 | 6 | 195 | 3 | 4.1 | Very slightly soluble | Do. |
| 20c | do | 500 | 3,000 | 15 | 195 | 6 | 8.2 | Insoluble | Do. |
| 21c | do | 500 | 4,625 | 30 | 195 | 9.25 | 12.7 | do | Do. |
| 22c | do | 500 | 6,250 | 40 | 195 | 12.5 | 17.2 | do | Do. |
| 23c | do | 500 | 7,750 | 47 | 195 | 15.5 | 21.2 | do | Do. |
| 24c | do | 500 | 9,500 | 54 | 195 | 19 | 26.0 | do | Do. |

TABLE IX

| Ex. No | Amine | Amine, grs. | Octylene oxide, grams | Time period, hrs. | Max. Temp., °C. | Weight ratio, oxide/amine | Molal ratio, oxide/amine | 1 part/100 by solubility weight in H₂O, 20° C. | 1 part/100 by solubility weight in kerosene, 20° C. |
|---|---|---|---|---|---|---|---|---|---|
| 25c | Diethylaminopropylamine | 500 | 545 | 6 | 195 | 1.1 | 1.1 | Slightly soluble | Slightly soluble. |
| 26c | do | 500 | 1,090 | 18 | 195 | 2.2 | 2.2 | Insoluble | Soluble. |
| 27c | do | 500 | 1,635 | 29 | 175 | 3.3 | 3.3 | do | Do. |
| 28c | do | 500 | 2,180 | 40 | 175 | 4.4 | 4.4 | do | Do. |
| 29c | do | 500 | 2,725 | 49 | 195 | 5.4 | 5.5 | do | Do. |
| 30c | do | 500 | 3,815 | 59 | 195 | 7.5 | 7.7 | do | Do. |
| 31c | 3,3'-iminobispropylamine | 500 | 1,500 | 6 | 175 | 3 | 3.1 | Very slightly soluble | Do. |
| 32c | do | 500 | 3,000 | 15 | 195 | 6 | 6.1 | Insoluble | Do. |
| 33c | do | 500 | 4,625 | 30 | 195 | 9.25 | 9.5 | do | Do. |
| 34c | do | 500 | 6,250 | 40 | 195 | 12.5 | 12.8 | do | Do. |
| 35c | do | 500 | 7,750 | 45 | 195 | 15.5 | 15.9 | do | Do. |
| 36c | do | 500 | 9,500 | 51 | 195 | 19 | 19.5 | do | Do. |

Section D

*Example 1d.*—The reaction vessel employed was a stainless steel autoclave with the usual devices for heating, heat control, stirrer, inlet, outlet, etc., which is conventional in this type of apparatus. The capacity was approximately four liters. The stirrer operated at a speed of approximately 250 r.p.m. There were charged into the autoclave 17000 grams of compound 1a, 200 grams of 3500 grams of compound 8b was treated with 4500 grams of propylene oxide at a temperature of 135° over a period of 10 hours.

Ignoring the xylene and sodium methylate and considering only the polyamine and the alkylene oxides, the resultant product represents 6 parts by weight of butylene oxide, 9 parts by weight of propylene oxide, to one part by weight of diethylene triamine.

TABLE X

| Ex. No. | Composition before—Amount of OSC,[1] catalyst and solvent constant before second oxyalkylation | | | | Composition at end | | | Operating conditions | | |
|---|---|---|---|---|---|---|---|---|---|---|
| | OSC[1] Ex. No. | OSC,[1] grams | Catalyst, grams | Solvent, grams | Oxide used BuO, grams | Weight ratio | | Max. pres., p.s.i. | Max. temp., °C. | Time of reaction, hrs. |
| | | | | | | PrO | BuO polyamine | | | |
| 1d | 1a | 1,700 | 15 | 200 | 400 | 7.5 | 2 | 48 | 155 | 2 |
| 2d | 1a | 1,700 | 15 | 200 | 1,200 | 7.5 | 6 | 48 | 155 | 6 |
| 3d | 3a | 4,700 | 15 | 200 | 400 | 22.5 | 2 | 48 | 155 | 3 |
| 4d | 7a | 1,700 | 15 | 200 | 600 | 7.5 | 3 | 48 | 155 | 2½ |
| 5d | 7a | 1,700 | 15 | 200 | 1,200 | 7.5 | 6 | 48 | 155 | 6 |
| 6d | 10a | 6,200 | 15 | 200 | 400 | 30 | 2 | 48 | 155 | 3 |
| 7d | 13a | 1,700 | 15 | 200 | 400 | 7.5 | 2 | 48 | 155 | 2 |
| 8d | 13a | 1,700 | 15 | 200 | 600 | 7.5 | 3 | 48 | 155 | 3 |
| 9d | 20a | 3,200 | 15 | 200 | 400 | 15 | 2 | 48 | 155 | 3 |
| 10d | 22a | 6,200 | 15 | 200 | 400 | 30 | 2 | 48 | 155 | 3½ |
| 11d | 25a | 1,700 | 15 | 200 | 600 | 7.5 | 3 | 48 | 155 | 2 |
| 12d | 26a | 3,200 | 15 | 200 | 400 | 15.0 | 2 | 48 | 155 | 1½ |
| 13d | 27a | 4,700 | 15 | 200 | 400 | 22.5 | 2 | 48 | 155 | 2 |
| 14d | 31a | 1,700 | 15 | 200 | 1,000 | 7.5 | 5 | 48 | 155 | 4½ |
| 15d | 32a | 3,200 | 15 | 200 | 600 | 15.0 | 3 | 48 | 155 | 3 |

[1] Oxyalkylation-susceptible compound.
NOTE.—The end product was a yellow liquid in all instances.

TABLE XI

| Ex. No. | Composition before—Amount of OSC,[1] catalyst and solvent constant before second oxyalkylation | | | | Composition at end | | | Operating conditions | | |
|---|---|---|---|---|---|---|---|---|---|---|
| | OSC[1] Ex. No. | OSC,[1] grams | Catalyst, grams | Solvent, grams | Oxide used PrO, grams | Weight ratio | | Max. pres., p.s.i. | Max. temp., °C. | Time of reaction, hrs. |
| | | | | | | PrO | BuO polyamine | | | |
| 16d | 1b | 2,000 | 9 | 200 | 3,000 | 6 | 3 | 48 | 135 | 4 |
| 17d | 1b | 2,000 | 9 | 200 | 4,500 | 9 | 3 | 48 | 135 | 9 |
| 18d | 2b | 3,500 | 9 | 200 | 3,000 | 6 | 6 | 48 | 135 | 4½ |
| 19d | 8b | 2,000 | 9 | 200 | 6,000 | 12 | 3 | 48 | 135 | 14 |
| 20d | 8b | 3,500 | 9 | 200 | 4,500 | 9 | 6 | 48 | 135 | 10 |
| 21d | 9b | 5,125 | 9 | 200 | 1,500 | 3 | 9.25 | 48 | 135 | 3 |
| 22d | 13b | 2,000 | 9 | 200 | 6,000 | 12 | 3 | 48 | 135 | 13 |
| 23d | 14b | 3,500 | 9 | 200 | 1,500 | 3 | 6 | 48 | 135 | 2 |
| 24d | 17b | 8,250 | 9 | 200 | 1,500 | 3 | 15.5 | 48 | 135 | 4 |
| 25d | 20b | 3,500 | 9 | 200 | 4,500 | 9 | 6 | 48 | 135 | 9 |
| 26d | 20b | 3,500 | 9 | 200 | 1,500 | 3 | 6 | 48 | 135 | 3 |
| 27d | 21b | 5,125 | 9 | 200 | 1,500 | 3 | 8.5 | 48 | 135 | 3 |
| 28d | 28b | 2,680 | 9 | 200 | 1,500 | 3 | 4.4 | 48 | 135 | 4 |
| 29d | 32b | 3,500 | 9 | 200 | 3,000 | 6 | 6 | 48 | 135 | 5 |
| 30d | 33b | 5,125 | 9 | 200 | 1,500 | 3 | 9.25 | 48 | 135 | 3 |

[1] Oxyalkylation-susceptible compound.
NOTE.—The end product was a yellow liquid in all instances.

*Example 34d.*—The procedure was similar to that in Example 1d except a 15 liter autoclave was used and 2000 grams of compound 7b was treated with 3000 grams of octylene oxide at a temperature of 185° over a period of 15 hours.

Ignoring the xylene and sodium methylate and considering only the polyamine and the alkylene oxides, the resultant product represents 3 parts by weight of butylene oxide, 6 parts by weight of octylene oxide, to one part by weight of diethylene triamine.

*Example 56d.*—The procedure was similar to that in Example 1d except 1045 grams of compound 25c was treated with 1500 grams of butylene oxide at a temperature of 155° C. over a period of 4 hours.

TABLE XII

| Ex. No. | Composition before—Amount of OSC,[1] catalyst and solvent constant before second oxyalkylation | | | | Composition at end | | | Operating conditions | | |
|---|---|---|---|---|---|---|---|---|---|---|
| | OSC[1] Ex. No. | OSC,[1] grams | Catalyst, grams | Solvent, grams | Oxide used octyl., grams | Weight ratio | | Max. pres., p.s.i. | Max. temp., °C. | Time of reaction, hrs. |
| | | | | | | Octyl. | BuO polyamine | | | |
| 31d | 1b | 2,000 | 15 | 200 | 1,500 | 3 | 3 | 48 | 185 | 6 |
| 32d | 1b | 2,000 | 15 | 200 | 3,000 | 6 | 3 | 48 | 185 | 16 |
| 33d | 2b | 3,500 | 15 | 200 | 500 | 1 | 6 | 48 | 185 | 2 |
| 34d | 7b | 2,000 | 15 | 200 | 3,000 | 6 | 3 | 48 | 185 | 15 |
| 35d | 8b | 3,500 | 15 | 200 | 1,500 | 3 | 6 | 48 | 185 | 6 |
| 36d | 10b | 6,750 | 15 | 200 | 500 | 1 | 12.5 | 48 | 185 | 2 |
| 37d | 13b | 2,000 | 15 | 200 | 1,000 | 2 | 3 | 48 | 185 | 3 |
| 38d | 19b | 2,000 | 15 | 200 | 3,500 | 7 | 3 | 48 | 185 | 17 |
| 39d | 20b | 3,500 | 15 | 200 | 2,500 | 5 | 6 | 48 | 185 | 14 |
| 40d | 21b | 5,125 | 15 | 200 | 1,000 | 2 | 8.5 | 48 | 185 | 3 |
| 41d | 25b | 1,045 | 15 | 200 | 4,000 | 8 | 1.1 | 48 | 185 | 29 |
| 42d | 26b | 1,590 | 15 | 200 | 3,000 | 6 | 2.2 | 48 | 185 | 14 |
| 43d | 27b | 2,135 | 15 | 200 | 1,500 | 3 | 3.3 | 48 | 185 | 7 |
| 44d | 31b | 2,000 | 15 | 200 | 1,500 | 3 | 3 | 48 | 185 | 7 |
| 45d | 32b | 3,500 | 15 | 200 | 500 | 1 | 6 | 48 | 185 | 2 |

[1] Oxyalkylation-susceptible compound.
NOTE.—The end product was a yellow liquid in all instances.

TABLE XIII

| Ex. No. | Composition before—Amount of OSC,[1] catalyst and solvent constant before second oxyalkylation | | | | Composition at end | | | Operating conditions | | |
|---|---|---|---|---|---|---|---|---|---|---|
| | OSC[1] Ex. No. | OSC,[1] grams | Catalyst, grams | Solvent, grams | Oxide used BuO, grams | Weight ratio | | Max. pres., p.s.i. | Max. temp., °C. | Time of reaction, hrs. |
| | | | | | | Octyl. | BuO polyamine | | | |
| 46d | 1c | 2,000 | 15 | 200 | 3,000 | 3 | 6 | 48 | 155 | 7 |
| 47d | 1c | 2,000 | 15 | 200 | 1,500 | 3 | 3 | 48 | 155 | 4 |
| 48d | 2c | 3,500 | 15 | 200 | 500 | 6 | 1 | 48 | 155 | 2 |
| 49d | 7c | 2,000 | 15 | 200 | 6,000 | 3 | 12 | 48 | 155 | 15 |
| 50d | 7c | 2,000 | 15 | 200 | 500 | 3 | 1 | 48 | 155 | 2 |
| 51d | 13c | 2,000 | 15 | 200 | 2,500 | 3 | 4 | 48 | 155 | 4 |
| 52d | 13c | 2,000 | 15 | 200 | 2,500 | 3 | 5 | 48 | 155 | 5 |
| 53d | 14c | 3,500 | 15 | 200 | 1,000 | 6 | 2 | 48 | 155 | 2½ |
| 54d | 19c | 2,000 | 15 | 200 | 2,500 | 3 | 5 | 48 | 155 | 5½ |
| 55d | 20c | 3,500 | 15 | 200 | 1,000 | 6 | 2 | 48 | 155 | 2 |
| 56d | 25c | 1,045 | 15 | 200 | 1,500 | 1.1 | 3 | 48 | 155 | 4 |
| 57d | 25c | 1,045 | 15 | 200 | 500 | 1.1 | 1 | 48 | 155 | 2 |
| 58d | 26c | 1,590 | 15 | 200 | 2,000 | 2.2 | 4 | 48 | 155 | 4 |
| 59d | 31c | 2,000 | 15 | 200 | 3,000 | 3 | 6 | 48 | 155 | 7 |
| 60d | 34c | 6,250 | 15 | 200 | 1,000 | 12.5 | 2 | 48 | 155 | 3 |

[1] Oxyalkylation-susceptible compound.
NOTE.—The end product was a yellow liquid in all instances.

Ignoring the xylene and sodium methylate and considering only the polyamine and the alkylene oxides, the resultant product represents 1.1 parts by weight of octylene oxide, 3 parts by weight of butylene oxide, to one part by weight of diethyl aminopropylamine.

*Example 67d.*—The procedure was similar to that in Example 1d except 1700 grams of compound 13a was treated with 1000 grams of octylene oxide at a temperature of 185° C. over a period of 9 hours.

Considering only the polyamine and the alkylene oxides, the resultant product represents 7.5 parts by weight of propylene oxide, 5 parts by weight of octylene oxide to one part by weight of tetraethylene pentamine.

*Example 90d.*—The procedure was similar to that in

TABLE XIV

| Ex. No. | Composition before—Amount of OSC,[1] catalyst and solvent constant before second oxyalkylation | | | | Composition at end | | | Operating conditions | | |
|---|---|---|---|---|---|---|---|---|---|---|
| | OSC[1] Ex. No. | OSC,[1] grams | Catalyst, grams | Solvent, grams | Oxide used octyl., grams | Weight ratio | | Max. pres., p.s.i. | Max. temp., °C. | Time of reaction, hrs. |
| | | | | | | Octyl. | PrO polyamine | | | |
| 61d | 1a | 1,700 | 15 | 200 | 600 | 3 | 7.5 | 48 | 185 | 5 |
| 62d | 1a | 1,700 | 15 | 200 | 1,000 | 5 | 7.5 | 48 | 185 | 10 |
| 63d | 3a | 4,700 | 15 | 200 | 400 | 2 | 22.5 | 48 | 185 | 3 |
| 64d | 7a | 1,700 | 15 | 200 | 1,000 | 5 | 7.5 | 48 | 185 | 9 |
| 65d | 7a | 1,700 | 15 | 200 | 1,400 | 7 | 7.5 | 48 | 185 | 15 |
| 66d | 10a | 6,200 | 15 | 200 | 200 | 1 | 30 | 48 | 185 | 3 |
| 67d | 13a | 1,700 | 15 | 200 | 1,000 | 5 | 7.5 | 48 | 185 | 9 |
| 68d | 13a | 1,700 | 15 | 200 | 3,000 | 15 | 7.5 | 48 | 185 | 43 |
| 69d | 20a | 3,200 | 15 | 200 | 800 | 4 | 15 | 48 | 185 | 9 |
| 70d | 22a | 6,200 | 15 | 200 | 400 | 2 | 30 | 48 | 185 | 4 |
| 71d | 25a | 1,700 | 15 | 200 | 2,400 | 12 | 7.5 | 48 | 185 | 36 |
| 72d | 26a | 3,200 | 15 | 200 | 1,000 | 5 | 15.0 | 48 | 185 | 10 |
| 73d | 27a | 4,700 | 15 | 200 | 400 | 2 | 22.5 | 48 | 185 | 4 |
| 74d | 31a | 1,700 | 15 | 200 | 1,000 | 5 | 7.5 | 48 | 185 | 10½ |
| 75d | 32a | 3,200 | 15 | 200 | 600 | 3 | 15.0 | 48 | 185 | 5 |

[1] Oxyalkylation-susceptible compound.
NOTE.—The end product was a yellow liquid in all instances.

TABLE XV

| Ex. No. | Composition before—Amount of OSC,[1] catalyst and solvent constant before second oxyalkylation | | | | Composition at end | | | Operating conditions | | |
|---|---|---|---|---|---|---|---|---|---|---|
| | OSC[1] Ex. No. | OSC,[1] grams | Catalyst, grams | Solvent, grams | Oxide used PrO, grams | Weight ratio | | Max. pres., p.s.i. | Max. temp., °C. | Time of reaction, hrs. |
| | | | | | | Octyl. | PrO polyamine | | | |
| 76d | 1c | 2,000 | 15 | 200 | 3,000 | 3 | 6 | 48 | 135 | 3½ |
| 77d | 1c | 2,000 | 15 | 200 | 4,500 | 3 | 9 | 48 | 135 | 8 |
| 78d | 2c | 3,500 | 15 | 200 | 3,000 | 6 | 6 | 48 | 135 | 4 |
| 79d | 7c | 2,000 | 15 | 200 | 6,000 | 3 | 12 | 48 | 135 | 14 |
| 80d | 7c | 2,000 | 15 | 200 | 4,500 | 3 | 9 | 48 | 135 | 9 |
| 81d | 13c | 2,000 | 15 | 200 | 1,500 | 3 | 3 | 48 | 135 | 3 |
| 82d | 13c | 2,000 | 15 | 200 | 6,000 | 3 | 12 | 48 | 135 | 12 |
| 83d | 8c | 3,500 | 15 | 200 | 1,500 | 6 | 3 | 48 | 135 | 2 |
| 84d | 19c | 2,000 | 15 | 200 | 1,500 | 3 | 3 | 48 | 135 | 4 |
| 85d | 20c | 3,500 | 15 | 200 | 4,500 | 6 | 9 | 48 | 135 | 8 |
| 86d | 25c | 1,045 | 15 | 200 | 1,500 | 1.1 | 3 | 48 | 135 | 3 |
| 87d | 26c | 1,045 | 15 | 200 | 1,500 | 1.1 | 3 | 48 | 135 | 3 |
| 88d | 26c | 1,590 | 15 | 200 | 1,500 | 2.2 | 3 | 48 | 135 | 4½ |
| 89d | 31c | 2,000 | 15 | 200 | 3,000 | 3 | 6 | 48 | 135 | 6 |
| 90d | 34c | 6,250 | 15 | 200 | 1,500 | 12.5 | 3 | 48 | 135 | 3½ |

[1] Oxyalkylation-susceptible compound.
NOTE.—The end product was a yellow liquid in all instances.

Example 1d except a 15 liter autoclave was used and 6250 grams of compound 34c was treated with 1500 grams of propylene oxide at a temperature of 135° C. over a period of 3½ hours.

Considering only the polyamine and the alkylene oxides, the resultant product represents 12.5 parts by weight of octylene oxide, 3 parts by weight of propylene oxide to one part by weight of 3,3'-iminobispropyl amine.

*Example 91d.*—The procedure was similar to that in Example 1a except propylene diamine was treated with a premixed alkylene oxide mixture containing 1500 grams of propylene oxide and 400 grams of butylene oxide at a temperature of 155° C. over a period of three hours. The composition of the resulting formulation was similar to Example 1d.

It is obvious that mixtures of octylene oxide and propylene oxide, or octylene oxide and butylene oxide, could be employed in a manner similar to the above. Also a formulation such as 1a, 2a, 15b, 22c etc. could be treated with any one of the mixtures outlined above to give compositions similar to those shown in Tables X, XI, XII, XIII, XIV or XV.

Section E

Needless to say, after obtaining products of the kind described in Part 2, Sections A through D preceding, such compounds can be reacted further with ethylene oxide or glycidol or a combination of the two to give other compounds of the kind suitable for use in the present invention. It is not believed, in light of what has been said previously, that any further description of oxyalkylation procedure is required. The procedure may simply be the continuation of the previous steps with or without the addition of catalysts, particularly alkylene catalysts or may represent a separate step.

The following table includes examples which exemplify these products which are suitable compositions for use of the herein described invention.

TABLE XVI

| Ex. No. | Oxyalkylated intermediate, see— | | Amt., grams | EtO, grams | Glycidol, grams | Operating conditions | | |
|---|---|---|---|---|---|---|---|---|
| | Table No. | Ex. No. | | | | Max. pres., p.s.i. | Max. temp., °C. | Time of reaction, hrs. |
| 1e | I | 3a | 4,700 | 356 | | 60 | 140 | 2 |
| 2e | I | 5a | 7,700 | | 400 | 50 | 70 | 2 |
| 3e | II | 15a | 4,700 | 83 | | 60 | 140 | 3 |
| 4e | II | 22a | 6,200 | | 130 | 50 | 70 | 2 |
| 5e | IV | 4b | 6,750** | 890 | | 60 | 140 | 4 |
| 6e | IV | 5b | 8,250** | | 1,500 | 50 | 70 | 5 |
| 7e | IV | 9b | 5,125 | 427 | | 60 | 140 | 3 |
| 8e | IV | 9b | 5,125 | | 360 | 50 | 70 | 2½ |
| 9e | IV | 9b | 5,125 | 212 | 360* | 60 | 140 | 3 |
| 10e | V | 16b | 6,750 | 116 | 196 | 60 | 140 | 3 |
| 11e | V | 16b | 6,750** | 232 | | 60 | 140 | 2 |
| 12e | VI | 29b | 3,225 | 169 | | 60 | 140 | 2 |
| 13e | VII | 4c | 6,750** | 298 | | 60 | 140 | 3 |
| 14e | VIII | 16c | 6,750** | | 196 | 50 | 70 | 2 |
| 15e | X | 2d | 2,700 | 238 | | 60 | 140 | 2 |
| 16e | XI | 21d | 6,625 | | 360 | 50 | 70 | 2 |
| 17e | XI | 24d | 9,750** | 118 | 198* | 60 | 140 | 3 |
| 18e | XII | 34d | 5,000 | | 360 | 50 | 70 | 2 |
| 19e | XIII | 52d | 4,500 | 235 | | 60 | 140 | 2 |
| 20e | XIV | 65d | 3,100 | 86 | | 60 | 140 | 2 |

NOTE.—The appearance of an asterisk in the glycidol column is used to indicate that the glycidol was added first and then the ethylene oxide. The appearance of a double asterisk in the third column indicates that the added catalyst such as sodium methylate was added in modest amounts, generally 5 to 10 grams. These products, ethylene oxide, glycidol, or a combination of the two are used terminally.

It will be noted that reference in the second column of the table is to the product described in one or more of the previous tables and in the third column the amount is shown in grams. This again corresponds in grams to the products of the previous tables. The subsequent addition of ethylene oxide or glycidol or both is shown in grams. Where both of these last two mentioned oxides appear, unless otherwise stated, the ethylene oxide was added first and then the glycidol.

In the reactions described in Table XVI, the ethylene oxide and/or glycidol was added terminally. The precursory polyamine can instead be reacted with one or more moles of ethylene oxide or glycidol or a combination of the two. Such initially reacted polyamine having increased hydrophilic properties could then, for all practical purposes, be employed in the same manner as the unreacted polyamine. Typical examples are shown below:

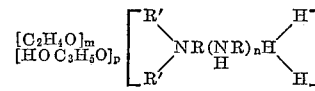

| Ex. No. | R | R' | n | m | p |
|---|---|---|---|---|---|
| 01 | C₂H₄ | H | 1 | 1 | 0 |
| 02 | C₂H₄ | H | 0 | 2 | 0 |
| 03 | C₃H₆ | H | 0 | 0 | 2 |
| 04 | C₂H₄ | H | 2 | 3 | 0 |
| 05 | C₂H₄ | H | 2 | 0 | 1 |
| 06 | C₂H₄ | CH₃ | 0 | 2 | 0 |
| 07 | C₂H₄ | C₂H₅ | 0 | 0 | 2 |
| 08 | C₂H₄ | H | 3 | 0 | 2 |
| 09 | C₂H₄ | H | 3 | 1 | 0 |
| 010 | C₆H₁₂ | H | 0 | 2 | 0 |
| 011 | C₃H₆ | H | 1 | 2 | 0 |
| 012 | C₃H₆ | H | 1 | 0 | 1 |
| 013 | C₃H₆ | CH₃ | 0 | 3 | 0 |
| 014 | C₃H₆ | C₂H₅ | 0 | 0 | 2 |

The products shown above were then further reacted as shown in the following examples:

*Example 21e.*—The material herein employed was prepared as explained in Part 2, Table I, Example 9a, except 285 grams of material prepared in Example 01 above was employed instead of 200 grams of diethylene triamine.

*Example 22e.*—The material herein employed was prepared as explained in Part 2, Table I, Example 5a, except 400 grams of material prepared in Example 03 above was employed instead of 200 grams of propylene diamine.

*Example 23e.*—The material herein employed was prepared as explained in Part 2, Table IV, Example 10b, except 714 grams of material prepared in Example 01 above was employed instead of 500 grams of diethylene triamine.

*Example 24e.*—The material herein employed was prepared as explained in Part 2, Table VIII, Example 16c, except 890 grams of material prepared in Example 08 above was employed instead of 500 grams of tetraethylene pentamine.

In addition to initial and terminal reaction with ethylene oxide and/or glycidol, these latter materials may be employed as intermediate reactants as is shown in the following Examples 25e–28e. The operating conditions, amount of catalyst used, etc., were otherwise identical.

*Example 25e.*—The reaction conditions were similar to those employed in Part 2, Table II, Example 15a, except 2300 grams of propylene oxide was added to the 200 grams of tetraethylene pentamine followed by 83 grams of ethylene oxide before the final addition of the remaining 2200 grams of propylene oxide.

*Example 26e.*—The reaction conditions were similar to those employed in Part 2, Table IV, Example 9b, except 2300 grams of butylene oxide was added to 500 grams of diethylene triamine followed by 360 grams of glycidol. This was then followed by the addition of 2325 grams of butylene oxide.

*Example 27e.*—The reaction conditions were similar to those employed in Part 2, Table VI, Example 29b, except 2300 grams of butylene oxide was added to 500 grams of 3,3'-iminobispropylamine followed by 169 grams of ethylene oxide. This was followed by the addition of 2325 grams of butylene oxide.

*Example 28e.*—The reaction conditions were similar to those employed in Part 2, Table V, Example 16b, except 3000 grams of butylene oxide was added to 500 grams of tetraethylene pentamine followed by 116 grams of ethylene oxide which was followed by 196 grams of glycidol. There was then added 3250 grams of butylene oxide.

Examples illustrating both initial and terminal treat-

Section F

It is hardly necessary to indicate the third step required to prepare a composition of the kind herein employed and characterized by the fact that its composition involves the use of three alkylene oxides. The same procedure is followed as in the previous sections of this Part 2, and in the table immediately following, reference is made to prior tables appearing in Part 2 and also to a specific example in the table. The amount employed, i.e., the amount of the specific example, is identically the same as appears in the previous table of reference and includes the catalyst and solvent. This amount appears in the fourth column of Table XVII. An asterisk appears in either column 5, 6 or 7 to indicate the particular oxide used in the final step. In column 8, the amount of oxide used is shown. The operating conditions are reported in the last three columns and in the same manner as in previous tables.

TABLE XVII

| Ex. No. | See Table No. | Ex. No. of such Table | Amt. used, grams | Oxide used | | | Operating conditions | | | |
|---|---|---|---|---|---|---|---|---|---|---|
| | | | | PrO | ButO | OctO | Amt. of oxide used, grams | Max. pres., p.s.i. | Max. temp., °C. | Time of reaction, hrs. |
| 1f | X | 1d | 2,100 | | | * | 400 | 48 | 185 | 2 |
| 2f | X | 4d | 2,300 | | | * | 600 | 48 | 185 | 3 |
| 3f | X | 8d | 2,300 | | | * | 800 | 48 | 185 | 4 |
| 4f | X | 14d | 2,700 | | | * | 400 | 48 | 185 | 2 |
| 5f | XI | 20d | 8,000 | | | * | 400 | 48 | 185 | 2 |
| 6f | XI | 22d | 8,000 | | | * | 800 | 48 | 185 | 4 |
| 7f | XI | 25d | 8,000 | | | * | 500 | 48 | 185 | 3 |
| 8f | XI | 29d | 6,500 | | | * | 400 | 48 | 185 | 2 |
| 9f | XII | 31d | 3,500 | * | | | 2,500 | 48 | 135 | 5 |
| 10f | XII | 34d | 5,000 | * | | | 2,000 | 48 | 135 | 4 |
| 11f | XII | 37d | 3,000 | * | | | 2,000 | 48 | 135 | 4 |
| 12f | XII | 41d | 5,045 | * | | | 1,000 | 48 | 135 | 2 |
| 13f | XIII | 47d | 3,500 | * | | | 1,500 | 48 | 135 | 2 |
| 14f | XIII | 50d | 2,500 | * | | | 2,000 | 48 | 135 | 4 |
| 15f | XIII | 56d | 2,545 | * | | | 2,000 | 48 | 135 | 4 |
| 16f | XIV | 61d | 2,300 | | * | | 600 | 48 | 155 | 2 |
| 17f | XIV | 67d | 2,700 | | * | | 1,200 | 48 | 155 | 4 |
| 18f | XIV | 74d | 2,700 | | * | | 800 | 48 | 155 | 3 |
| 19f | XV | 79d | 8,000 | | * | | 400 | 48 | 155 | 2 |
| 20f | XV | 84d | 1,500 | | * | | 1,400 | 48 | 155 | 6 | ment with ethylene oxide and/or glycidol are the following Examples 29e–31e.

*Example 29e.*—The 4785 grams of material prepared in Example 21e was treated with an additional 85 grams of ethylene oxide.

*Example 30e.*—The 7900 grams of material prepared in Example 22e was treated with an additional 200 grams of glycidol.

*Example 31e.*—The 7140 grams of material prepared in Example 24e was treated with an additional 390 grams of glycidol.

It does not appear necessary to show detailed examples of instances where one oxide is added first and then the other two in mixture; however, note a number of such examples in Table XVIII immediately following. In this instance, reference is made to a prior table in Part 2 where only one oxide was used. The third column makes specific reference to an example of such table. The amount used is indicated in grams and includes the solvent and catalyst in the same way that such data was included in Table XVI preceding. In the next column, the first asterisk and the double asterisk indicate the two

TABLE XVIII

| Ex. No. | See Table | Ex. of such | Amt. grams used | Oxides used | | | Amt. of oxide used in mixture, grams | Amt. of oxide used in mixture, grams | Operating conditions | | |
|---|---|---|---|---|---|---|---|---|---|---|---|
| | | | | PrO | ButO | OctO | | | Max. pres., p.s.i. | Max. temp., °C. | Time of reaction, hrs. |
| 21f | I | 1a | 1,700 | | * | ** | *400 | **400 | 48 | 180 | 4 |
| 22f | I | 7a | 1,700 | | * | ** | *400 | **400 | 48 | 180 | 4 |
| 23f | I | 8a | 3,200 | | * | ** | *400 | **200 | 48 | 180 | 3 |
| 24f | II | 13a | 1,700 | | * | ** | *400 | **600 | 48 | 180 | 6 |
| 25f | II | 20a | 3,200 | | * | ** | *400 | **400 | 48 | 180 | 4 |
| 26f | II | 21a | 4,700 | | * | ** | *200 | **200 | 48 | 180 | 2 |
| 27f | III | 26a | 3,200 | | * | ** | *200 | **600 | 48 | 180 | 4 |
| 28f | III | 32a | 3,200 | | * | ** | *200 | **200 | 48 | 180 | 2 |
| 29f | IV | 2b | 3,500 | * | | ** | *1,000 | **300 | 48 | 180 | 6 |
| 30f | IV | 7b | 2,000 | * | | ** | *500 | **800 | 48 | 180 | 6 |
| 31f | V | 20b | 3,500 | * | | ** | *300 | **400 | 48 | 180 | 4 |
| 32f | V | 21b | 5,125 | * | | ** | *100 | **200 | 48 | 180 | 2 |
| 33f | VI | 25b | 1,045 | * | | ** | *500 | **1,000 | 48 | 180 | 7 |
| 34f | VI | 27b | 2,135 | * | | ** | *100 | **300 | 48 | 180 | 3 |
| 35f | VII | 1c | 2,000 | * | ** | | *1,000 | **500 | 48 | 155 | 3 |
| 36f | VII | 7c | 2,000 | * | ** | | *500 | **700 | 48 | 155 | 4 |
| 37f | VIII | 13c | 2,000 | * | ** | | *500 | **700 | 48 | 155 | 4 |
| 38f | VIII | 19c | 2,000 | * | ** | | *500 | **700 | 48 | 155 | 4 |
| 39f | IV | 26c | 1,590 | * | ** | | *300 | **300 | 48 | 155 | 3 |
| 40f | IX | 31c | 2,000 | * | ** | | *500 | **700 | 48 | 155 | 4 | oxides used in the mixture. In the next columns a single asterisk followed by a number indicates the grams of the previously designated oxide employed, whereas in the next table the same applies to the second oxide identified again by a double asterisk. The final column shows the operating conditions as in previous tables.

Simply referring to Table XVIII preceding with reference back to the appropriate preceding table in Part 2, one can readily obtain the ratios of reactants employed in which the three oxides are mixed together and then added to the polyamine. It is doubtful that examples are required, but the following are included.

*Example 41f.*—The procedure employed for the preparation of Example 21f, Table XVIII, is similar to that in Example 20d, Part 2, Section D, except 1700 grams of material prepared as outlined in Table I, Example 1a, was placed in the described autoclave and treated over a period of 4 hours at a temperature of 180° and 48# pressure with a mixture composed of 400 grams of butylene oxide and 400 grams of octylene oxide.

*Example 42f.*—The procedure employed for the preparation of Example 27f, Table XVIII, is as outlined above except 3200 grams of material 26a, Table III, was treated over a period of 4 hours at a temperature of 180° and a maximum pressure of 48 pounds with a mixture composed of 200 grams of butylene oxide and 600 grams of octylene oxide.

*Example 43f.*—The procedure employed for the preparation of Example 30f was as outlined in Example 41f except 2000 grams of material prepared as outlined in Table IV, Example 7b, was treated at 180° C. and a maximum pressure of 48 pounds with 1300 grams of a mixture composed of 500 grams of propylene oxide and 800 grams of octylene oxide. The addition required six hours.

*Example 44f.*—The procedure employed for the preparation of Example 36f was as outlined in Example 41f except 2000 grams of material prepared as outlined in Table VII, Example 7c, was treated at 155° C. and a maximum pressure of 48 pounds with 1200 grams of a mixture composed of 500 grams of propylene oxide and 700 grams of butylene oxide. The addition required four hours.

Section G

Needless to say, after obtaining products of the kind described in Part 2, Section F preceding, such compounds can be reacted further with ethylene oxide or glycidol or a combination of the two to give compounds of the kind suitable for use in the present invention. It is not believed, in light of what has been said previously, that any further description of oxyalkylation procedure is required. The procedure may simply be the continuation of the previous steps with or without the addition of catalysts, or may represent a separate step.

The following table includes examples which exemplify these products which are suitable compositions for use in the herein described invention.

It will be noted that reference in the second column of the table is to products described in a previous table and in the fourth column the amount is shown in grams. This again corresponds in grams to the products of the previous table. The subsequent addition of ethylene oxide or glycidol or both is shown in grams.

In the reactions described in Table XIX, the ethylene oxide and/or glycidol was added terminally. The precursory polyamine can instead, as described in Examples 21e–24e, be reacted with one or more moles of ethylene oxide or glycidol or a combination of the two, or these latter materials may be employed as intermediates as in Examples 25e–28e, or they may be employed both initially and terminally or intermediately and initially and/or terminally. Examples illustrating these procedures follow. The initially treated polyamines employed are those immediately preceding Example 21e.

*Example 11g.*—The material herein employed was prepared as explained in Part 2, Table XVI, Example 1e, except 400 grams of material prepared in Example 03 was employed instead of the initial 200 grams of propylene diamine.

*Example 12g.*—The material herein employed was prepared as explained in Part 2, Table XVI, Example 2e, except 285 grams of material prepared in Example 01, was employed instead of the initial 200 grams of diethylene triamine.

*Example 13g.*—The material herein employed was prepared as explained in Part 2, Table XVI, Example 6e, except 890 grams of material prepared in Example 08 was employed instead of 500 grams of tetraethylene pentamine.

*Example 14g.*—The material herein employed was prepared as explained in Example 11g except the product was treated with an additional 200 grams of glycide.

*Example 15g.*—The material herein employed was prepared as explained in Example 11g except the product was treated with an additional 83 grams of ethylene oxide.

*Example 16g.*—The material herein employed was prepared as explained in Example 12g except the product was treated with an additional 85 grams of ethylene oxide.

*Example 17g.*—The material herein employed was prepared as explained in Example 13g except the product was treated with an additional 195 grams of glycide.

*Example 18g.*—The materials and reaction conditions were as employed in Example 11g except a different order of addition was employed, thus: 200 grams of propylene diamine was treated with 1500 grams of propylene oxide, 200 grams of glycide, 400 grams butylene oxide, 200 grams glycide and finally 200 grams of octylene oxide.

*Example 19g.*—The product was as above except the second glycide treatment was replaced by treating with 83 grams ethylene oxide.

*Example 20g.*—The materials and reaction conditions

TABLE XIX

| Ex. No. | Oxyalkylated intermediate see Table No. | Ex. No. | Amt., grams | EtO, grams | Glycidol grams | Operating Conditions | | |
|---|---|---|---|---|---|---|---|---|
| | | | | | | Max. Pressure | Max. Temp. °C. | Time of Reaction Hours |
| 1g | XVII | 21f | 2,500 | 356 | | 60 | 140 | 2 |
| 2g | XVII | 22f | 2,500 | | 400 | 50 | 70 | 2 |
| 3g | XVII | 24f | 2,700 | 83 | | 60 | 140 | 2 |
| 4g | XVII | 25f | 4,000 | | 130 | 50 | 70 | 2 |
| 5g | XVII | 26f | 5,100 | | 130 | 50 | 70 | 2 |
| 6g | XVII | 29f | 4,800 | 890 | | 60 | 140 | 4 |
| 7g | XVII | 30f | 4,200 | 212 | 360* | 60 | 140 | 3 |
| 8g | XVII | 33f | 2,545 | 169 | | 60 | 140 | 2 |
| 9g | XVII | 34f | 2,535 | 169 | | 60 | 140 | 2 |
| 10g | XVII | 35f | 3,500 | 298 | | 60 | 140 | 3 |

*The appearance of an asterisk in the glycidol column is used to indicate that the glycidol was added first and then the ethylene oxide.

were as employed in Example 12g except a different order of addition was employed, thus: 200 grams of diethylene triamine was treated with 1500 grams of propylene oxide followed by 85 grams of ethylene oxide, 600 grams of butylene oxide, 85 grams of ethylene oxide and finally 800 grams of octylene oxide.

*Example 21g.*—The example is as above except the diethylene triamine was treated with the 85 grams of ethylene oxide, then followed by the propylene oxide, butylene oxide, ethylene oxide, and octylene oxide as outlined above.

PART 3

Section A

*Example A1.*—The procedure, equipment and conditions were as outlined in Example 1a except 500 grams of propylene diamine was treated at 190° C. with 3500 grams of $C_{16}$–$C_{18}$ olefin oxide over a period of thirty hours.

*Example A2.*—The procedure, equipment and conditions were as outlined in Example 2a except 500 grams of diethylene triamine was treated at 150° C. with 2500 grams of alpha pinene oxide over a period of 22 hours.

*Example A3.*—The procedure, equipment and conditions were as outlined above except 2500 grams of dipentene monoxide was used in place of the alpha pinene oxide.

*Example A4.*—The procedure was as outlined in Example 3a except 500 grams of tetraethylene pentamine was treated, at 190° C. with 2500 grams of dodecene oxide over a period of 26 hours.

*Example A5.*—The procedure was as outlined in Example 4a except 500 grams of ethylene bisoxypropylamine was treated with 2500 grams of dodecene oxide over a period of 30 hours.

*Example A6.*—The procedure was as outlined in Example 2a except 500 grams of diethylene triamine was treated, at 150° C. with 3000 grams of cyclohexene oxide over a period of 25 hours.

*Example A7.*—The procedure was as outlined in Example 2a except 500 grams of diethylene triamine was treated, at 150° C. with 3000 grams of styrene oxide over a period of 20 hours.

*Example A8.*—The product, 4000 grams, secured in Example A1 was transferred to a 15 liter autoclave and treated at 135° C. with 100 grams of ethylene oxide over a period of one hour.

*Example A9.*—The product, 3000 grams secured in Example A2, was treated at 70° C. with 100 grams of glycidol over a period of 1¼ hours.

*Example A10.*—The product, 3000 grams secured in Example A3, was treated at 80° C., with 100 grams of methyl glycide over a period of 3 hours.

Section B

*Example B1.*—The product, 400 grams, prepared in Example A1 was transferred to a 15 liter autoclave and treated at 155° C., with 1500 grams of butylene oxide over a period of 4 hours.

*Example B2.*—The product, 300 grams, prepared in Example A2 was treated at 185° C., with 500 grams of oxide over a period of 4 hours.

*Example B3.*—The product, 3000 grams, prepared in Example A3 was treated at 135° C., with 500 grams of propylene oxide over a period of 2 hours.

*Example B4.*—The product, 3000 grams, prepared in Example A4 was transferred a 15 liter autoclave and treated at 135° C., with 3000 grams of propylene oxide over a period of 6 hours.

*Example B5.*—The product, 3000 grams, secured in Example A5 was transferred to a 15 liter autoclave and treated at 135° C., with 500 grams of ethylene oxide over a period of 3 hours. The temperature was now raised to 155° C. and 500 grams of butylene oxide added over a period of 3 hours.

*Example B6.*—The product, 3000 grams, secured in Example A6 was transferred to a 15 liter autoclave and treated at 155° C., with 1000 grams of butylene oxide over a period of three hours.

*Example B7.*—The product, 3500 grams, secured in Example A6 was transferred to a 15 liter autoclave and treated at 185° C., with 1500 grams of octylene oxide over a period of 8 hours.

*Example B8.*—The product, 4100 grams, secured in Example A8 was treated at 185° C., with 1000 grams of octylene oxide over a period of 7 hours.

*Example B9.*—The product, 3100 grams, secured in Example A9 was treated at 155° C., with 500 grams of butylene oxide over a period of 2 hours.

*Example B10.*—The product, 3100 grams, secured in Example A9 was treated, after transfer to a 15 liter autoclave, at 135° C., with 1500 grams of propylene oxide over a period of 3 hours.

*Example B11.*—The product, 3100 grams, secured in Example A10 was transferred to a 15 liter autoclave and treated at 185° C., with 1500 grams of octylene oxide over a period of 12 hours.

*Example B12.*—The product, 3500 grams, prepared in Example A7 was transferred to a 15 liter autoclave and treated with 200 grams of ethylene oxide at 140° C., over a period of 3 hours followed by 1000 grams of butylene oxide at 155° C. over a period of 6 hours.

*Example B13.*—The product, 3000 grams, prepared in Example A5 was transferred to a 15 liter autoclave and treated at 135° C., with 1000 grams of propylene oxide over a period of 3 hours. This was followed by treatment at 185° C. with 500 grams of octylene oxide over a period of 3 hours.

*Example B14.*—The product, 3500 grams, prepared in Example B3 was transferred to a 15 liter autoclave and treated at 155° C. with 1500 grams of butylene oxide over a period of 4 hours.

*Example B15.*—The product, 6000 grams, prepared in Example B4 was treated at 155° C. with 500 grams of butylene oxide over a period of 2 hours followed by treatment, at 140° with 200 grams of ethylene oxide over a period of 3 hours.

*Example B16.*—The product, 4500 grams, prepared in Example B13 was treated at 155° C. with 500 grams of butylene oxide over a period of 2 hours.

*Example B17.*—The product, 5000 grams, prepared in Example B16 was treated at 140° C. with 200 grams of ethylene oxide over a period of 3 hours.

*Example B18.*—The product, 4500 grams, prepared in Example B13 was treated at 70° C. with 200 grams of glycidol over a period of 4 hours.

PART 4

The composition herein claimed is merely the result of mechanical mixture. Such mechanical mixture involves only the selection of the particular stabilizer and the addition of a predetermined proportion. Such addition may be made to a conduit or a pipe or a line through which the fuel is flowing, or can be added in a storage tank or in any other suitable container. For the purpose of predetermining an approximate ratio in regard to the stabilizing agent, our preference is to use several concentrations of Example 2b, obtained by reacting one part by weight of diethylene triamine with six parts by weight of butylene oxide.

Our preferred test is the comparatively high-temperature short-time test which is noted subsequently in regard to comparative tests with commercially available competitive products. However, a test of the kind described in the first paragraph of column 5 of U.S. Patent 2,714,057, dated July 26, 1955, to Chenicek, can be employed. Similarly, another suitable test is described in the last paragraph, et seq., of column 4 of U.S. Patent No. 2,760,852, dated August 28, 1956, to Stevens et al.

In any suitable test our preference is to add to the oil the inhibitor in a range of 15 to 1000 p.p.m. At the end of such test an appropriate ratio can be selected.

Having selected an appropriate ratio by means of the particular example above noted, to wit, Example 2b, one now can make similar comparative tests with other examples herein described as suitable for stabilization of the fuel. In other words, it simply means the selected test within the appropriate predetermined range would be repeated using one or more examples with the result that some other stabilizer obtained perhaps with a different ratio of oxide could be employed.

Note previous reference has been made to comparative tests in which a comparatively high temperature and a comparatively short period of time is employed. Actually, we have examined three of the most widely sold competitive products on the market specifically intended for stabilization as herein described and the tests are reported in the following table. Note in numerous instances the degree of stability imparted to the fuel by means of one or more of the herein described stabilizing agents is approximately two to three times as good as that of competitive products.

The following are results obtained from a thermal stability test on a fresh commercial diesel oil. The test involves heating the oil for 90 minutes at 300° F., cooling for two hours, filtering through moderately retentive filter paper to collect sludge particles, and determining the color of the filtrate oil in optical density units. The instrument for measuring color is the AC Model Fisher Electrophotometer using filter No. 510–A and n-heptane set at zero O.D.U. Sludge is determined by observing the degree of stain on the filter paper.

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| 3b | Moderate | 41 |
| 8b | Very light | 11 |
| 11b | Moderate | 77 |
| 14b | Light | 30 |
| 17b | Moderate | 80 |
| 20b | Light | 45 |
| 22b | Moderately heavy | 83 |
| 27b | Very light | 27 |
| 32b | do | 15 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 8b | Light | 31 |
| 11b | Moderate | 86 |
| 14b | do | 50 |
| 20b | Light | 55 |
| 27b | do | 32 |
| 32b | do | 35 |

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| 3a | Moderately heavy | 90 |
| 8a | Light | 30 |
| 11a | Moderately heavy | 50 |
| 14a | Light | 30 |
| 17a | Moderately heavy | 85 |
| 20a | Moderate | 43 |
| 22a | Moderately heavy | 96 |
| 27a | Light | 29 |
| 33a | Moderate | 57 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 8a | Moderate | 85 |
| 11a | Moderately heavy | 90 |
| 14a | Moderate | 54 |
| 20a | do | 65 |
| 27a | do | 78 |
| 33a | Moderately heavy | 93 |

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| 3c | Moderate | 53 |
| 8c | Very light | 14 |
| 11c | Moderately heavy | 85 |
| 14c | Moderate | 43 |
| 17c | do | 82 |
| 20c | do | 61 |
| 22c | Moderately heavy | 92 |
| 27c | Light | 36 |
| 32c | Very light | 19 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 8c | Light | 39 |
| 11c | Moderately heavy | 97 |
| 14c | Moderate | 67 |
| 20c | do | 71 |
| 27c | Light | 45 |
| 32c | do | 31 |

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| 4d | Very light | 12 |
| 5d | do | 11 |
| 8d | Light | 23 |
| 19d | do | 19 |
| 24d | Moderately heavy | 87 |
| 29d | Moderate | 28 |
| 33d | Very light | 13 |
| 43d | Light | 23 |
| 51d | do | 19 |
| 58d | do | 17 |
| 65d | Moderate | 35 |
| 72d | do | 32 |
| 77d | Very light | 10 |
| 90d | Moderately heavy | 93 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 5d | Light | 27 |
| 29d | Moderately heavy | 85 |
| 43d | Moderate | 67 |
| 58d | Light | 23 |
| 65d | Moderately heavy | 94 |
| 77d | Light | 19 |
| 90d | Heavy | 97 |

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| 1e | Moderate | 47 |
| 3e | Light | 19 |
| 7e | Very light | 13 |
| 11e | Moderate | 53 |
| 17e | Moderately heavy | 91 |
| 21e | Light | 23 |
| 23e | Moderate | 34 |
| 25e | Light | 28 |
| 26e | Moderately heavy | 75 |
| 29e | Moderate | 53 |
| 30e | do | 56 |

The following are results obtained from a thermal stability test as indicated above with one exception. In this case the oil was not fresh but was aged for 28 days at 110° F. before the test as indicated previously was applied. The time indicated herein is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 1e | Moderate | 59 |
| 3e | do | 47 |
| 17e | Heavy | 98 |
| 21e | Light | 32 |
| 26e | Heavy | 94 |
| 29e | do | 89 |

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| 1f | Light | 19 |
| 2f | Very light | 11 |
| 10f | Moderate | 33 |
| 14f | Light | 27 |
| 19f | Heavy | 85 |
| 20f | Light | 24 |
| 22f | Moderate | 31 |
| 24f | Very light | 18 |
| 28f | Light | 24 |
| 33f | Moderate | 35 |
| 36f | Light | 27 |
| 39f | do | 26 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 2f | Light | 25 |
| 10f | Heavy | 81 |
| 19f | Very heavy | 98 |
| 22f | Heavy | 54 |
| 28f | Moderate | 36 |
| 33f | Heavy | 73 |
| 36f | Moderate | 41 |
| 39f | do | 40 |

[Untreated oil+150 p.p.m. indicated additive]

| Additive | Stain | Color (O.D.U.) |
|---|---|---|
| None | Very heavy | 100 |
| Competitive product A | Moderately Heavy | 100 |
| Competitive product B | do | 100 |
| Competitive product C | Very heavy | 100 |
| 3g | Light | 24 |
| 5g | Moderate | 51 |
| 7g | Heavy | 89 |
| 9g | Moderate | 58 |
| 12g | Light | 27 |
| 13g | do | 23 |
| 14g | Moderate | 45 |
| 17g | do | 43 |
| 19g | Light | 29 |
| 20g | Moderate | 37 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| 3g | Moderate | 64 |
| 5g | Heavy | 93 |
| 9g | do | 89 |
| 12g | Moderate | 49 |
| 13g | Light | 25 |
| 14g | Heavy | 94 |
| 19g | Moderate | 57 |
| 20g | Heavy | 87 |

[Untreated oil+150 p.p.m. indicated additive]

| Additive | Stain | Color (O.D.U.) |
|---|---|---|
| None | Very heavy | 100 |
| Competitive product A | Moderately heavy | 100 |
| Competitive product B | do | 100 |
| Competitive product C | Very heavy | 100 |
| A2 | Moderate | 43 |
| A7 | do | 41 |
| B4 | Light | 19 |
| B8 | Moderate | 66 |
| B14 | Light | 27 |

The following are results obtained from a thermal stability test as indicated above with one exception. In this case the oil was not fresh but was aged for 28 days at 110° F. before the test as indicated previously was applied. The time indicated here is generally accepted to be the equivalent of 4 months' storage at normal storage temperature.

[Untreated oil+150 p.p.m. indicated additive]

| Additive | Stain | Color (O.D.U.) |
|---|---|---|
| None | Extremely heavy | 100 |
| Competitive product A | Heavy | 100 |
| Competitive product B | do | 100 |
| Competitive product D | Very heavy | 100 |
| Competitive product E | Moderately heavy | 100 |
| A2 | Heavy | 86 |
| A7 | Moderate | 69 |
| B4 | Light | 33 |
| B14 | Moderate | 46 |

Under certain circumstances it is desirable to add a stabilizer to fuel which functions to prevent or affect some other property rather than sludge formation or discoloration as herein described. For instance, a metal deactivator may be added which prevents the formation of gums, which may be for the present purposes differentiated from sludges. Such metal deactivators prevent what is known as mercaptan gel or body.

The stabilizers herein described may be used in conjunction with such other stabilizers and it is understood the mere combination of other stabilizers does not depart from other inventions.

The stabilizers of the present invention are characterized by oil solubility and water-insolubility. The initial amines do not have this particular property. They are oxyalkylated so as to contribute these properties. In such oxyalkylation procedure one might reach a stage where oil solubility had been obtained but water in solubility had not been obtained. Inversely, one might obtain water insolubility but not necessarily oil solubility. This simply means the properties are in a broader zone between the properties of the original reactant and the properties of the stabilizing compounds herein described. In numerous instances such products which do not meet the herein specified requirement can be combined with high molal acids either monocarboxy or polycarboxy, such as higher fatty acids, talloil, napthenic acid, rosin acids, polymerized fatty acids, etc., so as to yield salts which do meet the requirements for solubility in oil and insolubility in water and do have a significant and substantial stabilizing effect but not equal generally speaking, to the herein described non-salt form stabilizing agent. We are aware of the effectiveness of these products but it is to be pointed out they are not included in the scope of the instant claims. Actually, one need not use a carboxy acid and indeed one could use an oil soluble sulfonic acid such as a mahogany sulfonate type acid, dodecylbenzene monosulfonic acid, etc., and the results herein obtained again are in the same category as in the case of the carboxy acids herein indicated.

We claim:

1. A fuel oil composition comprising a major amount of a distilled hydrocarbon fuel oil selected from the class consisting of furnace oils, diesel fuels, and jet engine fuels and a minor amount, sufficient to stabilize the fuel against the formation of sludge and undesirable color bodies, of the fuel oil-soluble product obtained by the oxyalkylation of monomeric polyamino compounds; said oxyalkylation being accomplished by the use of a monoepoxide having not over 18 carbon atoms and free from other functional groups, (a) the initial polyamino reactant being composed exclusively of carbon, hydrogen, oxygen and nitrogen atoms and containing 2 to 7 basic nitrogen atoms linked by a member of the class consisting of carbon atom chains having 2 to 7 carbon atoms and oxygen-interrupted carbon atom chains containing 2 to 7 carbon atoms;

(b) the initial polyamino reactant having a molecular weight of 60 to 275 and a plurality of reactive hydrogen atoms;

(c) the initial polyamino reactant being water soluble;

(d) the oxyalkylation end product being water insoluble;

(e) the oxyalkylation end product being within the molecular weight range of 300 to 8500 on an average statistical basis;

(f) the solubility characteristics of the oxyalkylation end product in respect to water and fuel oil being substantially the result of the oxyalkylation step;

(g) the molal ratio of alkylene oxides per initial reactive hydrogen atom being within the range of 1 to 45:1;

(h) The initial polyamino reactant representing up to 20% by weight of the oxyalkylation end product on a statistical basis;

(i) the preceding being based on the assumption of complete reaction involving the alkylene oxides and initial polyamino reactant.

2. The fuel oil composition of claim 1 wherein the nitrogen atoms of the initial polyamino reactant are linked by a carbon atom chain.

3. The fuel oil composition of claim 1 wherein the nitrogen atoms of the initial polyamino reactant are linked by a divalent alkylene radical selected from the class consisting of

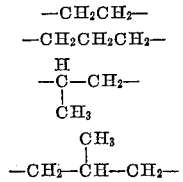

4. The fuel oil composition of claim 3 wherein the divalent alkylene radical is the ethylene radical.

5. The fuel oil composition of claim 3 wherein the amine is ethylene diamine.

6. The fuel oil composition of claim 3 wherein the amine is diethylene triamine.

7. The fuel oil composition of claim 3 wherein the amine is triethylene tetramine.

8. The fuel oil composition of claim 3 wherein the amine is tetraethylene pentamine.

9. The fuel oil composition of claim 3 wherein the amine is N-aminoethyl tetraethylene pentamine.

10. The fuel oil composition of claim 2 wherein the oxyalkylation is accomplished at least in part with at least one alkylene oxide selected from the class consisting of the straight chain butylene oxide isomer, propylene oxide and octylene oxide in combination with at least one alkylene oxide selected from the class consisting of ethylene oxide and glycide.

11. The fuel oil composition of claim 10 wherein the oxyalkylation is accomplished by the use of propylene oxide.

12. The fuel oil composition of claim 10 wherein the oxyalkylation is accomplished by the use of the straight chain butylene oxide isomer.

13. The fuel oil composition of claim 10 wherein the oxyalkylation is accomplished by the use of octylene oxide.

14. The fuel oil composition of claim 10 wherein the oxyalkylation is accomplished by the use of propylene oxide and the straight chain butylene oxide isomer.

15. The fuel oil composition of claim 10 wherein the oxyalkylation is accomplished by the use of propylene oxide and octylene oxide.

16. The fuel oil composition of claim 10 wherein the oxyalkylation is accomplished by the use of octylene oxide and the straight chain butylene oxide isomer.

17. The fuel oil composition of claim 10 wherein the oxyalkylation is accomplished by the use of propylene oxide, ethylene oxide and the straight chain butylene oxide isomer.

18. The fuel oil composition of claim 10 wherein the oxyalkylation is accomplished by the use of propylene oxide, glycide and the straight chain butylene oxide isomer.

19. The fuel oil composition of claim 10 wherein the oxyalkylation is accomplished by the use of propylene oxide, ethylene oxide, glycide, and the straight chain butylene oxide isomer.

20. The fuel oil composition of claim 10 wherein the oxyalkylation is accomplished by the use of propylene oxide, octylene oxide and ethylene oxide.

21. The fuel oil composition of claim 10 wherein the oxyalkylation is accomplished by the use of propylene oxide, octylene oxide and glycide.

22. The fuel oil composition of claim 10 wherein the oxyalkylation is accomplished by the use of propylene oxide, ethylene oxide, octylene oxide and glycide.

23. The fuel oil composition of claim 10 wherein the oxyalkylation is accomplished by the use of octylene oxide, ethylene oxide and the straight chain butylene oxide isomer.

24. The fuel oil composition of claim 10 wherein the oxyalkylation is accomplished by the use of octylene oxide, glycide and the straight chain butylene oxide isomer.

25. The fuel oil composition of claim 10 wherein the oxyalkylation is accomplished by the use of octylene oxide, ethylene oxide, glycide and the straight chain butylene oxide isomer.

26. The fuel oil composition of claim 10 wherein the oxyalkylation is accomplished by the use of propylene oxide, octylene oxide and the straight chain butylene oxide isomer.

27. The fuel oil composition of claim 10 wherein the oxyalkylation is accomplished by the use of propylene oxide, octylene oxide, ethylene oxide and the straight chain butylene oxide isomer.

28. The fuel oil composition of claim 10 wherein the oxyalkylation is accomplished by the use of propylene oxide, ethylene oxide, glycide and the straight chain butylene oxide isomer.

29. The fuel oil composition of claim 10 wherein the oxyalkylation is accomplished by the use of propylene oxide, octylene oxide, ethylene oxide glycide and the straight chain butylene oxide isomer.

30. The fuel oil composition of claim 2 wherein the oxyalkylation is accomplished at least in part by the use of a monoepoxide having 9 to 18 carbon atoms.

31. The fuel oil composition of claim 2 containing from about 5 pounds to about 200 pounds per thousand barrels of the fuel-oil soluble product.

References Cited in the file of this patent

UNITED STATES PATENTS

| | | |
|---|---|---|
| 1,970,578 | Schoeller et al. | Aug. 21, 1934 |
| 2,498,195 | Ballard et al. | Feb. 21, 1950 |
| 2,522,155 | Ballard et al. | Sept. 12, 1950 |
| 2,576,458 | Hill et al. | Nov. 27, 1951 |
| 2,674,619 | Lunsted | Apr. 6, 1954 |
| 2,677,700 | Jackson et al. | May 4, 1954 |
| 2,684,893 | Hughes et al. | July 27, 1954 |
| 2,805,998 | Cantrell et al. | Sept. 10, 1957 |
| 2,819,284 | Shen | Jan. 7, 1958 |